June 12, 1928.

P. G. GIRAULT 1,673,673

ELECTRICAL CONVERTER

Filed Dec. 14, 1922

Inventor:
Paul G. Girault,
by [signature]
His Attorney.

Patented June 12, 1928.

1,673,673

UNITED STATES PATENT OFFICE.

PAUL GABRIEL GIRAULT, OF PARIS, FRANCE, ASSIGNOR TO GENERAL ELECTRIC COMPANY, A CORPORATION OF NEW YORK.

ELECTRICAL CONVERTER.

Application filed December 14, 1922, Serial No. 606,950, and in France May 31, 1922.

My invention relates to alternating current dynamo electric machines, and more in particular to such machines as are used to transform balanced polyphase currents to unbalanced polyphase currents or to a single-phase current, and vice versa.

It is often desirable, for example for the operation of electric welding machines, to take one or more relatively large single-phase loads from a polyphase distributing system. When this is done it is desirable to provide apparatus which will take a balanced load from the polyphase circuit and deliver a single-phase current or an unbalanced polyphase current to the load in question in order to preserve a balanced condition on the polyphase system. One such apparatus is a set comprising a polyphase motor connected to the polyphase system and a single-phase generator supplying a single-phase load. It has also been proposed to provide separate windings on a common stator, one winding being supplied from a polyphase source and the other winding supplying the single phase load, both windings cooperating with a revolving field. My invention relates to the latter class, and its primary object is to arrange the two windings so that there is a minimum of mutual inductance between the two stator windings, but a very close magnetic coupling between the stator windings and the rotating field, whereby exchanges of power from one system to the other may be accomplished efficiently without unbalancing the polyphase system.

Figure 1:
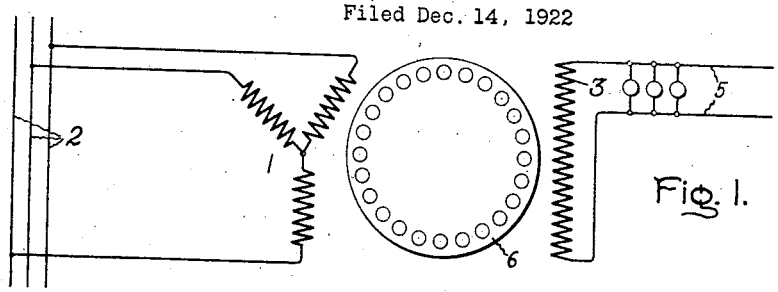
Figure 2:
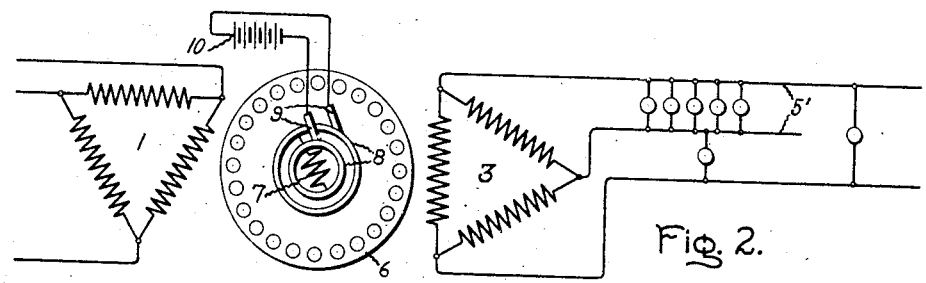
Figure 3:
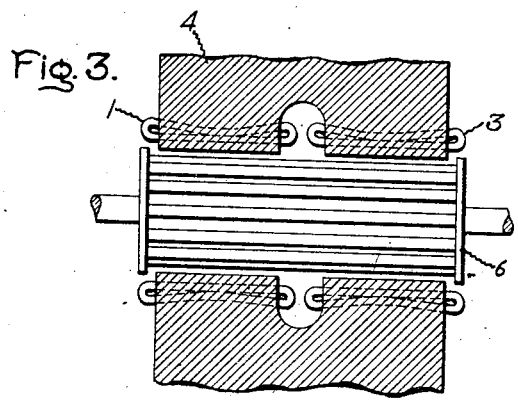
Figure 5:
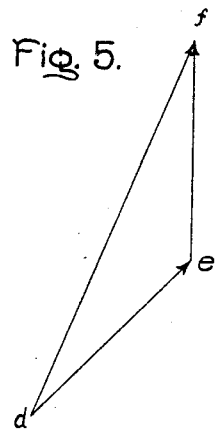
Figure 4:
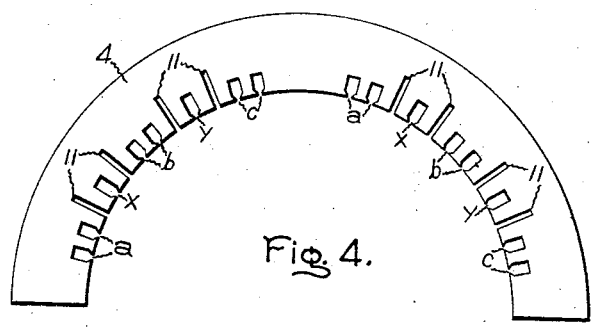

The features of my invention, which I believe to be novel and patentable, will be pointed out in the claims appended hereto. The preferred apparatus and manner of carrying my invention into effect will now be explained in connection with the accompanying drawings, in which Fig. 1 represents the electrical connections of a three-phase, single-phase asynchronous machine; Fig. 2 the electrical connections of a three-phase, three-phase synchronous machine; Fig. 3 one manner of preventing mutual inductance between the two stator windings of either of the machines represented in Figs. 1 and 2; Fig. 4 represents a portion of a stator showing a slot arrangement for preventing mutual inductance between two sets of different phase windings therein; and Fig. 5 is a vector diagram to be referred to in connection with the arrangement of Fig. 4.

Referring to the drawings, the armature of my machine comprises a primary winding 1, preferably a stator winding, connected to the supply system 2, a secondary winding 3, carried by the same magnetic core structure 4 as the first mentioned winding and connected to the load 5. For the purpose of illustrating my invention, the winding 1 will be taken as a polyphase winding connected to a balanced polyphase system 2; in Fig. 1 the winding 3 as a single-phase winding supplying a single-phase load 5; and in Fig. 2, the secondary winding 3 will be taken as a polyphase winding supplying an unbalanced polyphase load 5'. The field of my machine, or the part which transfers energy from one armature winding to the other, is preferably the rotor and consists of an induction motor secondary 6 here shown as of the squirrel cage type, but which may, for the purpose of starting, be of the wound rotor type. The machine may be asynchronous, as above described, or it may synchronous, in which case it comprises, in addition to the three windings mentioned above, a fourth winding 7, carried on the field member in conjunction with the squirrel cage winding for producing a field of definite polarity. When the field member is the rotor the winding 7 will be connected through slip rings 8 and brushes 9 to a suitable direct current source 10.

The invention will be explained by taking the case of converting polyphase into single-phase or vice versa with the same frequency, but all that is said will be equally applicable for secondary polyphase unbalanced current and also for different frequencies on the primary and secondary. In order to carry out the objects of my invention it is essential that the dissymmetries in the values of the polyphase currents passing through the first winding when it is loaded and in operation be reduced to the lowest possible value. In order to attain this end it will be necessary to eliminate the fluxes which are liable to disturb this polyphase symmetry. These fluxes are, first, the parasitic rotating flux due to the simple alternating current winding; and second, the fluxes common to the two stator windings, polyphase and single-phase, which do not pass through the rotor.

In order to reduce the rotating parasitic flux, it is desirable to employ a tertiary winding, preferably a squirrel cage winding, of low resistance, and to have a very low coefficient of leakage, that is to say, coefficients of leakage which are low for the stator secondary winding and for the rotor tertiary winding. This assumes a low reluctance in a radial direction and high leakage reluctance, a construction similar to that used in well designed induction motors. In order to reduce the fluxes which are common to the two stator windings but which do not pass through the rotor, the following means are employed, separately or in combination: first, to have separate slots for the two primary and secondary windings arranged so as to prevent mutual inductance; second, to form between the different groups of coils of the two primary and secondary windings zones of separation comprising dead slots or teeth of enlarged section adapted to have different proportions for the two primary and secondary windings and for the zones of separation; third, to separate the coils of the two primary and secondary windings into groups as far from each other as possible; fourth, in the latter case to separate the groups of coils of the two windings by purely magnetic screens.

When the primary and secondary windings are wound in separate groups it may happen that during the starting period the motor will stick at a reduced speed corresponding to a field harmonic. This difficulty may be remedied by using the two stator windings at starting. In the case of a three-phase single-phase machine, it would be possible, for example, to make up the two windings of identical polyphase parts, connect them in double star for starting and then for operating as a converter connect the polyphase sections which is to constitute the single phase winding, either in series with one phase reversed or in delta with one of the connections at the apex of the triangle and the other connection at the center of the opposite phase. This is possible with the windings represented in Fig. 2.

Two modifications for preventing mutual induction between the two stator windings have been illustrated. In Fig. 3 the armature windings 1 and 3 are entirely separated, except for the coupling produced by the common squirrel cage rotor 6. An unbalanced polyphase load, such as represented in Fig. 2, or a single-phase load, as in Fig. 1, drawn from a corresponding winding 3 on the machine shown in Fig. 3 would therefore have little if any effect on the balance of the system from which the polyphase winding 1 is supplied. If desirable, one or both halves of the rotor 6 might be provided with a direct current field winding for the correction of power factor or voltage regulation.

The modification shown in Fig. 4 represents one half of a four-pole stator magnet with the slots arranged for carrying out my invention. Slots $a$, $b$ and $c$ will be provided with a three-phase winding, and slots $x$ and $y$ will contain either separate single-phase windings supplying separate single-phase loads or these windings may be connected in series in a manner to give a resultant single-phase current. Thus in Fig. 5, let the line $d$, $e$ represent the current produced by a winding in slots $x$, and $e$, $f$ the current produced by the winding in slots $y$. Then if these windings are properly connected together, a resultant current represented by the line $d$, $f$ will flow. Separating the slots $x$ and $y$ from the three phase groups $a$, $b$ and $c$ are dead slots 11, designed to prevent mutual induction between the polyphase and single-phase groups. This construction still permits a very close magnetic union between the armature windings and the squirrel cage rotor and is effective in accomplishing in a large measure the object desired. In each case the supply system also furnishes the energy for producing rotation and overcoming the losses in the converter.

The present invention has particularly in view the applications to electric welding, heating rivets, electro-metallurgy and electro-chemistry, but it is not restricted thereto. In certain of these applications, the magnetic power absorbed by a device may be high. It will be possible in this case to work against this absorption of magnetic power by all the means known; particularly in the case of small installations, it will be well to arrange in parallel with the primary of the device, either directly or through the transformer, a battery of condensers making it possible to obtain a power factor of the devices as a whole which is satisfactory both as a momentary value and a mean value. In the secondary circuit it will be useful to employ variable contacts on the winding and also an auto-transformer which makes it possible to obtain a range of potentials which is desirable for certain applications. In the case where there are several single-phase consumption devices supplied by the secondary winding, the secondary winding may be furnished with as many pairs of diametrically opposite principal contacts as there are circuits to be supplied; these contacts will preferably be equidistant so as to have a pure polyphase reaction in the case of the simultaneous operation of all the circuits. The expressions stator and rotor as herein used relate to the construction ordinarily adopted, but the respective functions of these members may of course be reversed.

What I claim as new and desire to secure by Letters Patent of the United States, is:—

1. A dynamo electric machine comprising a plurality of mutually non-inductive, alternating current armature windings mounted on a common magnetic core, and a short-circuited winding rotatively mounted in close magnetic relation with respect to all of said armature windings.

2. A dynamo electric machine provided with a pair of mutually non-inductive, alternating current armature windings mounted on a common stator, a short-circuited winding rotatively mounted with respect to and in close magnetic relation with both of said armature windings, and means for producing a field of definite polarity in combination with said short-circuited winding.

3. A dynamo electric machine comprising a magnetic core and a plurality of distributed alternating current armature windings thereon, said windings being separated by magnetic barriers consisting of deep open slots in said core to prevent mutual inductance between said windings.

In witness whereof, I have hereunto set my hand this 27th day of November, 1922.

PAUL GABRIEL GIRAULT.